United States Patent
Ekambaram et al.

(10) Patent No.: US 10,664,267 B2
(45) Date of Patent: May 26, 2020

(54) AUTOMATICALLY DETECTING FEATURE MISMATCHES BETWEEN MOBILE APPLICATION VERSIONS ON DIFFERENT PLATFORMS

(71) Applicant: International Business Machines Corporation, Armonk, NY (US)

(72) Inventors: Vijay Ekambaram, Chennai (IN); Saurabh Sinha, Danbury, CT (US); Giriprasad Sridhara, Bangalore (IN); Rahul Krishna Yandrapally, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 15/004,238

(22) Filed: Jan. 22, 2016

(65) Prior Publication Data
US 2017/0212752 A1    Jul. 27, 2017

(51) Int. Cl.
*G06F 9/44*     (2018.01)
*G06F 8/71*     (2018.01)
(Continued)

(52) U.S. Cl.
CPC .......... *G06F 8/71* (2013.01); *G06F 8/74* (2013.01); *G06F 8/77* (2013.01); *G06F 16/148* (2019.01); *G06F 16/9024* (2019.01)

(58) Field of Classification Search
CPC ..... G06F 8/30–78; G06F 17/30–30197; G06F 17/30899–30997
See application file for complete search history.

(56) References Cited

U.S. PATENT DOCUMENTS 9,268,561 B1 * 2/2016 Srinivasa ............ G06F 9/44536
9,417,994 B2 * 8/2016 Ellis .................... G06F 11/3684
(Continued)

OTHER PUBLICATIONS

Joorabchi, Mona Erfani et al., "Detecting Inconsistencies in Multi-Platform Mobile Apps", The 26th IEEE International Symposium on Software Reliability Engineering (ISSRE 2015), Nov. 2-5, 2015, 51 pages, IEEE Digital Library.
(Continued)

*Primary Examiner* — Tammy E Lee
(74) *Attorney, Agent, or Firm* — Ference & Associates LLC (57) ABSTRACT

One embodiment provides a method of identifying discrepancies of an application operating on multiple operating platforms, the method including: utilizing at least one processor to execute computer code that performs the steps of: obtaining a first source code associated with an application of a first operating platform, the first source code including at least one feature of the application; generating, based on the first source code, a first context graph; obtaining a second source code associated with the application of a second operating platform, the second source code including the at least one feature of the application; generating, based on the second source code, a second context graph; comparing the first and second context graph; and identifying, based on the comparison, at least one discrepancy. Other variants and embodiments are broadly contemplated herein.

13 Claims, 3 Drawing Sheets

System Diagram (51) Int. Cl.
*G06F 16/14* (2019.01)
*G06F 16/901* (2019.01)
*G06F 8/77* (2018.01)
*G06F 8/74* (2018.01)

(56) References Cited

U.S. PATENT DOCUMENTS

| | | | |
|---|---|---|---|
| 9,569,207 B2* | 2/2017 | Km | G06F 8/73 |
| 9,779,009 B2* | 10/2017 | Suzuki | G06F 8/436 |
| 2014/0337820 A1* | 11/2014 | Km | G06F 8/433 717/123 |
| 2015/0286556 A1* | 10/2015 | Ellis | G06F 11/3684 717/125 |
| 2016/0179653 A1* | 6/2016 | Suzuki | G06F 8/436 717/126 |
| 2016/0259636 A1* | 9/2016 | Plate | G06F 8/68 |
| 2017/0192873 A1* | 7/2017 | Ozdemir | G06F 8/658 |

OTHER PUBLICATIONS

Choudhary, Shauvik Roy, "Cross-Platform Testing and Maintenance of Web and Mobile Applications", A Thesis Presented to the Academic Faculty, Georgia Institute of Technology, May 2015, 124 pages, Scholarly Materials and Research at Georgia Tech.

* cited by examiner

AUTOMATICALLY DETECTING FEATURE MISMATCHES BETWEEN MOBILE APPLICATION VERSIONS ON DIFFERENT PLATFORMS

BACKGROUND

Many popular mobile applications have different versions for different operating platforms (e.g., Android, iOS, etc.). An application on one operating platform may differ in features from the corresponding version on another operating platform for many reasons. These reasons can include, for example, design of the application by different developers and the use of different programming languages for each platform. Maintaining application consistency across platforms is a difficult challenge. Even when the same developer creates an application on different platforms, the problem exhibited is similar to writing a novel in multiple spoken languages simultaneously. The language can be very different depending on the context and grammar rules and there can be different levels of understanding for each type of requirement. A difficulty can arise during implementation of a certain feature of the language or application depending on the underlying platform library. Current mobile application developers believe that future mobile application development across different operating platforms will become increasingly difficult due to further fragmentation of these application platforms.

BRIEF SUMMARY

In summary, one aspect of the invention provides a method of identifying discrepancies between different versions of an application operating on multiple operating platforms, said method comprising: utilizing at least one processor to execute computer code that performs the steps of: obtaining a first source code associated with an application of a first operating platform, the first source code comprising at least one feature of the application; generating, based on the first source code, a first context graph; obtaining a second source code associated with the application of a second operating platform, the second source code comprising the at least one feature of the application; generating, based on the second source code, a second context graph; comparing the first and second context graph; and identifying, based on the comparison, at least one discrepancy between versions of the application.

Another aspect of the invention provides an apparatus for identifying discrepancies between different versions of an application operating on multiple operating platforms, said apparatus comprising: at least one processor; and a computer readable storage medium having computer readable program code embodied therewith and executable by the at least one processor, the computer readable program code comprising: computer readable program code associated with an application of a first operating platform, the first source code comprising at least one feature of the application; computer readable program code configured to generate, based on the first source code, a first context graph; computer readable program code configured to obtain a second source code associated with the application of a second operating platform, the second source code comprising the at least one feature of the application; computer readable program code configured to generate, based on the second source code, a second context graph; computer readable program code configured to compare the first and second context graph; and computer readable program code configured to identify, based on the comparison, at least one discrepancy between versions of the application.

An additional aspect provides a computer program product for identifying discrepancies between different versions of an application operating on multiple operating platforms, said product comprising: at least one processor; and a computer readable storage medium having computer readable program code embodied therewith and executable by the at least one processor, the computer readable program code comprising: computer readable program code associated with an application of a first operating platform, the first source code comprising at least one feature of the application; computer readable program code configured to generate, based on the first source code, a first context graph; computer readable program code configured to obtain a second source code associated with the application of a second operating platform, the second source code comprising the at least one feature of the application; computer readable program code configured to generate, based on the second source code, a second context graph; computer readable program code configured to compare the first and second context graph; and computer readable program code configured to identify, based on the comparison, at least one discrepancy between versions of the application.

A further aspect of the invention provides a method comprising: identifying mobile application differences across multiple implementations of the application by performing the steps of: generating a first context graph comprising characteristics from at least one first topic from a first source code, generating a second context graph comprising characteristics from the at least one topic from a second source code; and identifying discrepancies based on a similarity measure between the first and second context graph.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

In accordance with at least one embodiment of the invention, there are broadly contemplated herein methods and arrangements, inter alia, for identifying application differences across multiple operating platforms of mobile applications. Solutions toward this end, and others, will now be appreciated from the ensuing discussion. The features discussed above, and others, relating to at least one embodiment of the invention, will be better appreciated from the discussion which follows.

Generally, in analyzing platform application patterns, a determination of the documentation regarding a mobile application could be used to assess differences between features of applications across multiple operating platforms. Features or topics of applications (e.g., email applications, location applications, etc.) can include, but are not limited to, files that can access a desired feature of an application such as screens that can be viewed, buttons for accessibility, or drop-down menu instructions.

Figure 1:
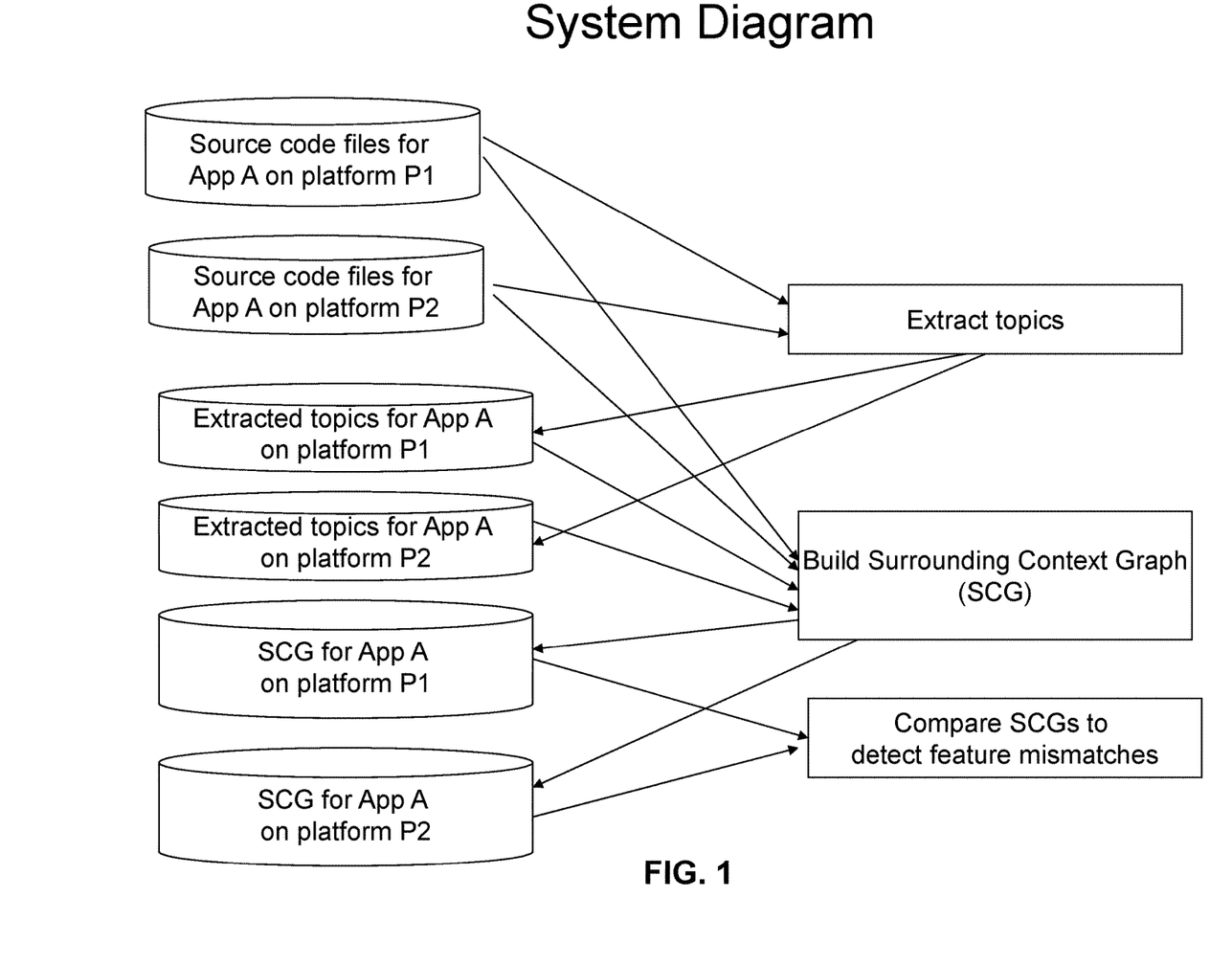
FIG. 1 schematically illustrates a system architecture for determining feature mismatches between multiple application platforms FIG. 2 sets forth a process more generally for determining platform feature mismatches.

In accordance with a general background relative to at least one embodiment of the invention, FIG. 1 schematically illustrates a general concept of identifying application differences across multiple operating platforms. The comparing of feature topics across the two platforms and for each topic can be used to create a surrounding context graph using the information from extracted feature topics. For example, a dynamic trace can be employed to "slip through" the source code or source file for information used in the creation of the surrounding context graph. These traces of user or user-simulated input and response of the system can be utilized for creating the surrounding context graphs. Furthermore, systems using "crawling" techniques through the source code or source code files by the user or a simulated user can also be employed. Comparing surrounding context graphs can be utilized to detect feature mismatches between the operating platforms of the mobile applications of interest. The surrounding context graphs contain incoming edges to a topic equal to files using this topic and outgoing edges from a topic wherein the files are then utilized by the topic. The graphs are compared for missing topics or discrepancies. If no graph is similar beyond a threshold of 80 percent, the topic is declared to be missing (a discrepancy has been identified) from one of the compared platforms. Topic modeling techniques such as Latent Dirichlect Allocation can be applied to source code files to obtain automatically or extract topics from the source code files of an application for the graph comparisons.

In one embodiment of the invention, topic modeling of a mobile application's source code across multiple operating platforms can be employed to obtain topics or features by using identifier names in the source code for topic extraction and comparison purposes. A resultant surrounding-context graph for each identified feature or topic can be generated on each operating platform (P1, P2), for example, but not limited to, Android and iOS. The same feature of mobile applications operating on different platforms may be implemented by using different words that may not be semantically similar, for example, the words "history" and "recent". Surrounding-context graphs (SCG) can be generated for each topic or feature by mapping the feature or topic of interest to a source file. The accessibility pathway, or history of the source file, is compared between the operating platforms of the mobile applications. Traditional cosine similarity can be employed to determine discrepancies between the source files of each operating platform by comparing the surrounding-context graphs that have been derived for each specific feature or topic. If no similar graphs are detected, then the topic is not present on the operating platforms. In other words, a feature mismatch is present between the mobile applications of the different operating platforms.

As such, there are broadly contemplated herein, in accordance with at least one embodiment of the invention, methods and arrangements for identifying mobile application differences across multiple implementations. At a very general level, FIG. 2 provides an overview of the main steps in a procedure broadly contemplated herein, with reference made to comparing surrounding context graphs of multiple mobile applications to determine discrepancy.

It can be appreciated from the foregoing that, in accordance with at least one embodiment of the invention, a technical improvement is represented. This can involve collecting a plurality of source codes from across multiple platform frameworks to automatically search for feature mismatches. For example, a feature may be present on one platform, but not on another. These differences arise primarily due to different code bases. The method described herein is a light weight analysis of source code without using expensive, dynamic information or instrumentation.

In accordance with at least one embodiment of the invention, very generally, quantitative values as determined herein, or other data or information as used or created herein, can be stored in memory or displayed to a user on a screen, as might fit the needs of one or more users.

Figure 2:
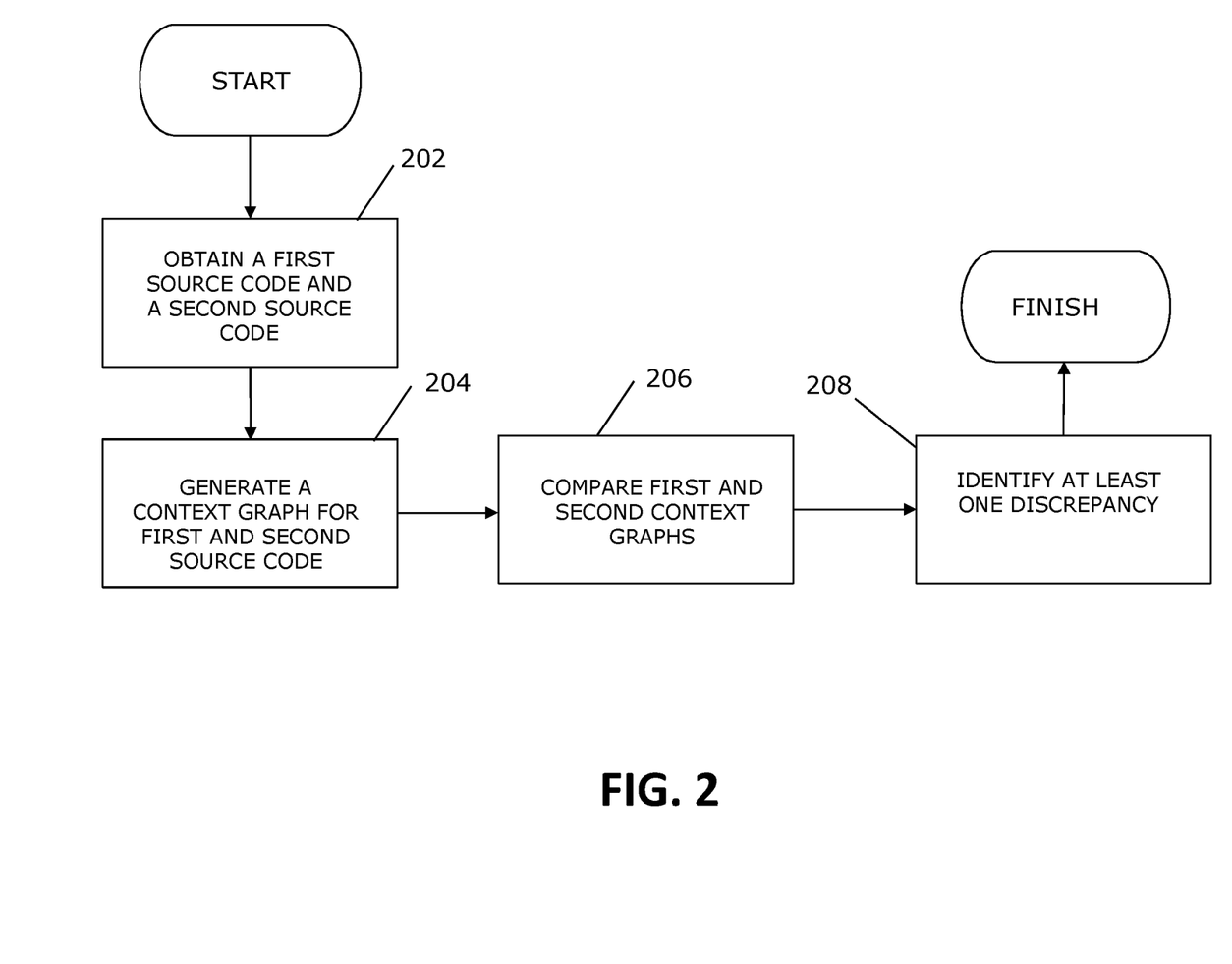
Figure 3:
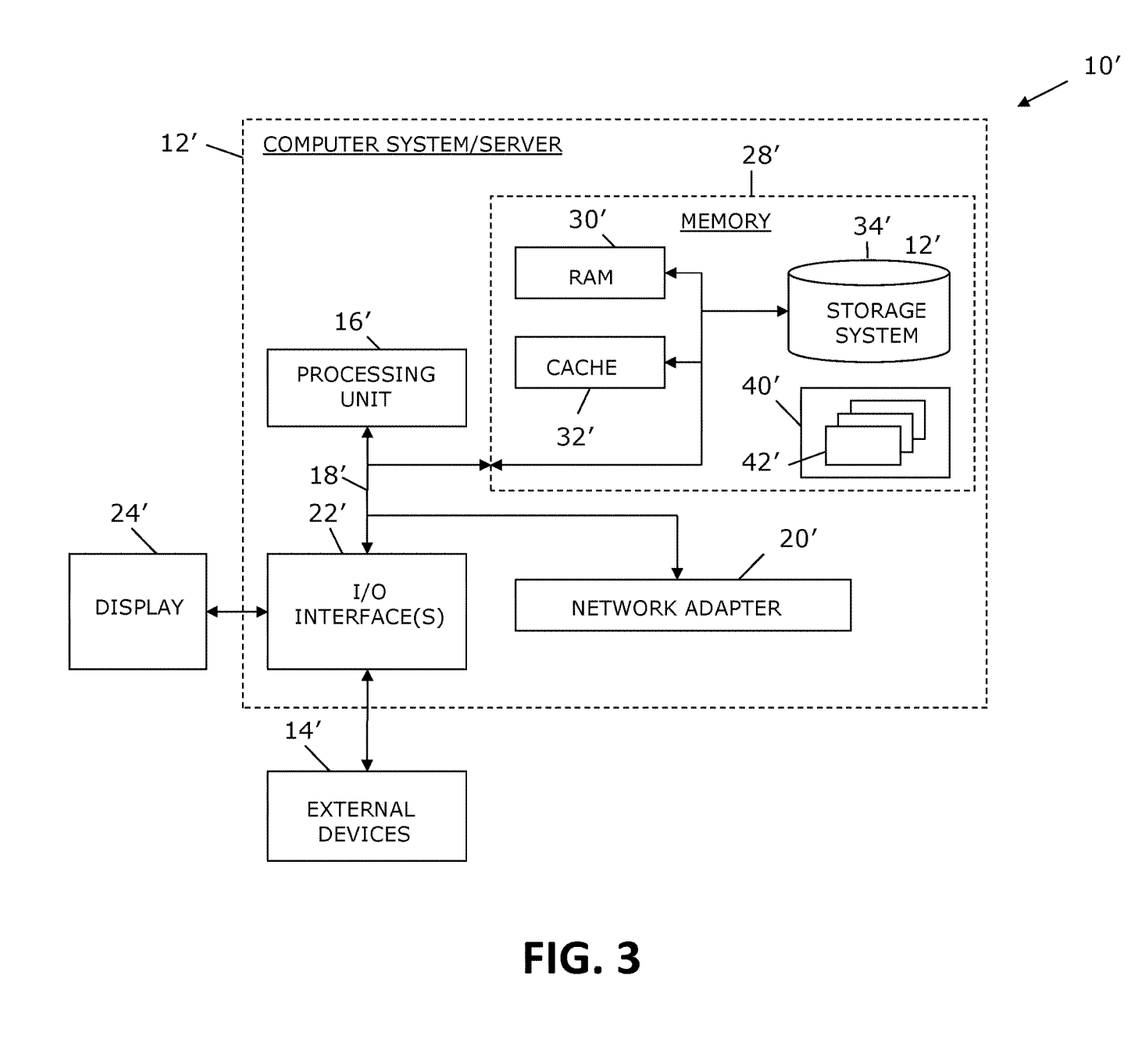
FIG. 3 illustrates a computer system.

It should be appreciated that a process, such as that broadly illustrated in FIG. 2, can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, a source code is obtained from a first source and a second source (202). Surrounding context graphs are generated from a first and second source code (204). The surrounding context graphs are compared (206). Discrepancies are then identified based on threshold differences (208).

Referring now to FIG. 3, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying discrepancies between different versions of a mobile application operating on multiple mobile operating platforms, said method comprising:
    utilizing at least one processor to execute computer code that performs the steps of:
    identifying a feature of the mobile application;
    mapping the feature to a first source file associated with the mobile application running on a first mobile operating platform, wherein the first source file comprises a history of user inputs and corresponding system responses for the mobile application running on the first mobile operating platform;
    generating, based on the first source file, a first context graph associated with the feature for the first mobile operating platform, wherein the first context graph comprises a representation of the history;
    mapping the feature to a second source file associated with the mobile application running on a second mobile operating platform, wherein the second mobile operating platform is different than the first mobile operating platform and wherein the second source file comprises a second history of user inputs and corresponding system responses for the mobile application running on the second mobile operating platform;
    generating, based on the second source file, a second context graph associated with the feature for the second mobile operating platform, wherein the second context graph comprises a representation of the second history;
    comparing the first context graph against the second context graph to determine whether the first context graph and the second context graph share a predetermined threshold level of similarity between the representation of the first history and the representation of the second history; and
    identifying, responsive to determining that the first context graph and the second context graph do not share the predetermined threshold level of similarity, at least one discrepancy between the mobile application running on the first mobile operating platform and the mobile application running on the second mobile operating platform.

2. The method of claim 1, wherein the at least one discrepancy comprises a difference between the first context graph and the second context graph.

3. The method according to claim 1, wherein the first context graph and the second context graph each comprise a surrounding context graph.

4. The method according to claim 1, wherein the comparing comprises employing a cosine similarity.

5. The method according to claim 1, wherein the comparing comprises analyzing source code via similarity analysis.

6. The method according to claim 1, wherein the comparing comprises utilizing cross-platform feature matching.

7. The method according to claim 1, wherein the generating the first context graph and the second context graph comprise employing a dynamic trace.

8. An apparatus for identifying discrepancies between different versions of a mobile application operating on multiple mobile operating platforms, said apparatus comprising:
    at least one processor; and
    a computer readable storage medium having computer readable program code embodied therewith and executable by the at least one processor, the computer readable program code comprising:
    computer readable program code configured to identify a feature of the mobile application;
    computer readable program code configured to map the feature to a first source file associated with the mobile application running on a first mobile operating platform, wherein the first source file comprises a history of user inputs and corresponding system responses for the mobile application running on the first mobile operating platform;
    computer readable program code configured to generate, based on the first source file, a first context graph associated with the feature for the first mobile operating platform, wherein the first context graph comprises a representation of the history;
    computer readable program code configured to map the feature to a second source file associated with the mobile application running on a second mobile operating platform, wherein the second mobile operating platform is different than the first mobile operating platform and wherein the second source file comprises a second history of user inputs and corresponding system responses for the mobile application running on the second mobile operating platform;
    computer readable program code configured to generate, based on the second source file, a second context graph associated with the feature for the second mobile operating platform, wherein the second context graph comprises a representation of the second history;
    computer readable program code configured to compare the first context graph against the second context graph to determine whether the first context graph and the second context graph share a predetermined threshold level of similarity between the representation of the first history and the representation of the second history; and
    computer readable program code configured to identify at least one discrepancy between the mobile application running on the first mobile operating platform and the mobile application running on the second mobile operating platform responsive to determining that the first context graph and the second context graph do not share the predetermined threshold level of similarity.

9. A computer program product for identifying discrepancies between different versions of an application operating on multiple operating platforms, said product comprising:
    a computer readable storage medium having computer readable program code embodied therewith, the computer readable program code executable by a processor and comprising:

computer readable program code configured to identify a feature of the mobile application;

computer readable program code configured to map the feature to a first source file associated with the mobile application running on a first mobile operating platform, wherein the first source file comprises a history of user inputs and corresponding system responses for the mobile application running on the first mobile operating platform;

computer readable program code configured to generate, based on the first source file, a first context graph associated with the feature for the first mobile operating platform, wherein the first context graph comprises a representation of the history;

computer readable program code configured to map the feature to a second source file associated with the mobile application running on a second mobile operating platform, wherein the second mobile operating platform is different than the first mobile operating platform and wherein the second source file comprises a second history of user inputs and corresponding system responses for the mobile application running on the second mobile operating platform;

computer readable program code configured to generate, based on the second source file, a second context graph associated with the feature for the second mobile operating platform, wherein the second context graph comprises a representation of the second history;

computer readable program code configured to compare the first context graph against the second context graph to determine whether the first context graph and the second context graph share a predetermined threshold level of similarity between the representation of the first history and the representation of the second history; and computer readable program code configured to identify at least one discrepancy between the mobile application running on the first mobile operating platform and the mobile application running on the second mobile operating platform responsive to determining that the first context graph and the second context graph do not share the predetermined threshold level of similarity.

10. The computer program product according to claim 9, wherein the at least one discrepancy comprises a difference between the first context graph and the second context graph.

11. The computer program product according to claim 9, wherein the first context graph and the second context graph each comprise a surrounding context graph.

12. The computer program product according to claim 9, wherein the comparing comprises employing a cosine similarity between the first context graph and the second context graph.

13. The computer program product according to claim 9, wherein the comparing comprises analyzing source code via similarity analysis.

* * * * *